United States Patent [19]
Zhang

[11] Patent Number: 6,064,934
[45] Date of Patent: May 16, 2000

[54] PROCESS AND DEVICE FOR REGULATING THE TORQUE DERIVED FROM A DRIVE UNIT

[75] Inventor: Hong Zhang, Regensburg, Germany

[73] Assignee: Robert Bosch GmbH, Stuttgart, Germany

[21] Appl. No.: 08/952,785

[22] PCT Filed: Mar. 3, 1997

[86] PCT No.: PCT/DE97/00378

§ 371 Date: Nov. 26, 1997

§ 102(e) Date: Nov. 26, 1997

[87] PCT Pub. No.: WO97/35739

PCT Pub. Date: Oct. 2, 1997

[30] Foreign Application Priority Data

Mar. 26, 1996 [DE] Germany .......................... 196 11 839

[51] Int. Cl.[7] .................................................. G06G 7/70
[52] U.S. Cl. ................. 701/51; 701/58; 701/60; 477/121; 477/158; 180/167; 180/65.1; 180/197; 318/139; 318/587; 318/170; 74/335

[58] Field of Search .................................. 701/51, 58, 60; 477/121, 158; 180/167, 65.1, 197; 318/139, 587, 170; 74/335

[56] References Cited

U.S. PATENT DOCUMENTS

| | | |
|---|---|---|
| 5,558,178 | 9/1996 | Hess et al. . |
| 5,757,153 | 5/1998 | Ito et al. .................................. 701/51 |
| 5,790,967 | 8/1998 | Kull et al. ................................ 701/51 |

FOREIGN PATENT DOCUMENTS

| | | |
|---|---|---|
| 0616919 | 9/1994 | European Pat. Off. . |
| 2277813 | 11/1994 | United Kingdom . |

*Primary Examiner*—William A. Cuchlinski, Jr.
*Assistant Examiner*—Olga Hernandez
*Attorney, Agent, or Firm*—Walter Ottesen

[57] ABSTRACT

A method and an arrangement are suggested for controlling torque outputted by a drive unit. In the method, a desired torque value is specified in dependence upon a desired torque value pregiven by the driver when there is transmission shift. Also, for protecting the transmission, a limit torque value is pregiven which serves to limit the torque outputted by the drive unit.

15 Claims, 4 Drawing Sheets

PROCESS AND DEVICE FOR REGULATING THE TORQUE DERIVED FROM A DRIVE UNIT

FIELD OF THE INVENTION

The invention relates to a method and an arrangement for controlling the torque outputted by a drive unit.

BACKGROUND OF THE INVENTION

It is known from U.S. Pat. No. 5,558,178 that the torque of a drive unit can be adjusted in dependence upon a pregiven desired torque value. This desired torque value is pregiven by the driver by actuating an operator-controlled element or is pregiven by additional control systems of the motor vehicle such as a drive slip control. Furthermore, and in the context of the above-identified patent application, it is suggested that a desired torque value for controlling the drive unit is transmitted from the transmission control to improve the shifting operation of an automatic transmission. This desired torque value represents the torque which is to be realized during the shifting operation. If no data as to the desired torque to be adjusted is available to the control of the drive unit during a transmission intervention, then the shift operation cannot be controlled in the manner desired. In lieu thereof, a complex adaptation of ignition angle, air supply and/or fuel supply in dependence upon the particular shift operation would have to be pregiven.

SUMMARY OF THE INVENTION

It is an object of the invention to provide measures, with the aid of which the torque of a drive unit can be adjusted via a desired torque value, even in combination with an automatic transmission, without such desired values being provided from the transmission control.

An adjustment of the torque, which is outputted by the drive unit, is made possible via a corresponding desired value (even in combination with an automatic transmission) during a shift operation and/or to protect the transmission. This adjustment is made without data as to the desired values for the torque, which is to be adjusted, being present from the transmission control.

It is especially advantageous that this procedure can be utilized for control systems wherein no torque data is transferred between transmission control unit and engine control unit, that is, in the event of a malfunction of this transfer in control systems wherein torque desired values are transferred from the transmission control to the engine control.

It is especially advantageous that a maximum adjustable torque is pregiven to protect the transmission. In this way, damage to the transmission unit can be effectively avoided for a standing or slowly travelling vehicle as a consequence of a torque which is adjusted too high.

With respect to the transmission, it is especially advantageous that the effective desired torque value is determined by the engine control itself in dependence upon variables available thereto. In an advantageous embodiment, only the data as to the shift operation is needed from the transmission control.

BRIEF DESCRIPTION OF THE DRAWINGS

The invention will be described below with respect to the embodiments shown in the drawing. Here, FIG. 1 shows an engine control apparatus; whereas.

FIG. 3 shows the solution of the invention as a flowchart; whereas, in

DESCRIPTION OF THE PREFERRED EMBODIMENTS OF THE INVENTION

Figure 1:
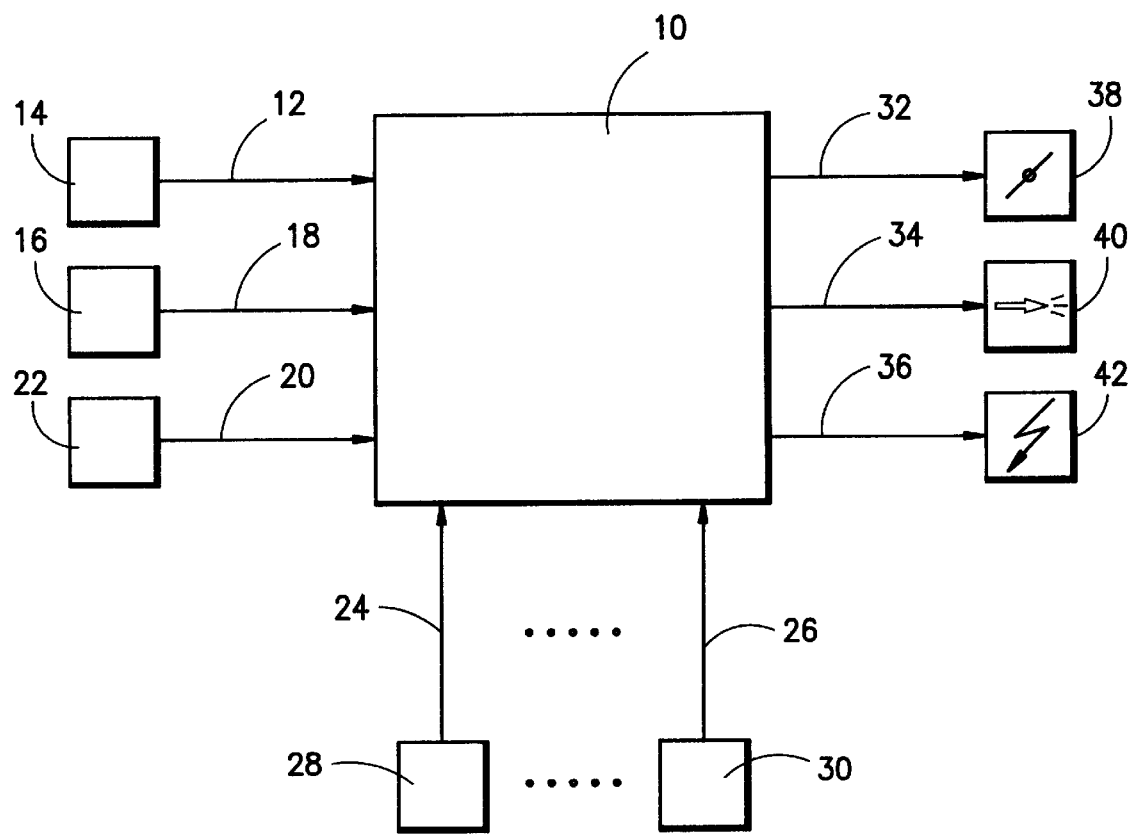

FIG. 1 shows a control unit 10 for controlling the torque of a drive unit. The control unit 10 includes at least one microcomputer (not shown) which operates on the output variables of the control unit 10 in the context of a control of the torque of the drive unit in dependence upon the supplied input variables. In the preferred embodiment, the control unit 10 is supplied via an input line 12 with an actuating signal of an accelerator pedal. The actuating signal is detected by a measuring device 14. In addition, a measure for the engine rpm is supplied via an input line 18 to the control unit 10. This measure for the rpm is from an rpm sensor 16. Also, and in a preferred embodiment, an input line 20 leads from an electronic transmission unit 22 to the control unit 10 via which a signal is supplied which defines the shift operation and the shift direction. In addition, input lines 24 to 26 are shown via which operating variables of the drive unit or the motor vehicle are supplied such as the engine temperature, the gear engaged, the road speed and/or the status of the consumers, such as the climate control system, power steering, et cetera. These operating variables are detected by measuring devices 28 to 30 and supplied via the input lines 24 to 26, respectively. The control unit 10 influences the torque outputted by the drive unit via the output lines 32, 34 and 36. In the preferred embodiment of an internal combustion engine, the following operating parameters are influenced: air supply (power actuating element 38), the fuel metering 40 and/or the ignition angle 42.

On the basis of the supplied operating variables, the microcomputer of the control unit 10 forms a desired torque value for the drive unit in accordance with the known state of the art. In the preferred embodiment, the drive unit is an internal combustion engine and the microcomputer forms the desired torque value by adjusting the actuating element, which influences the supply of air, by influencing the fuel metered to the engine and/or by adjusting the ignition angle adjustment in the sense of a control of the actual torque to the desired torque.

In order to achieve a satisfactory operation of the engine control, a desired torque of this kind must not only be computed and adjusted in dependence upon the accelerator pedal actuation or in the drive slip control case; instead, and with a view to the operation of an automatic transmission, the desired torque must be computed and adjusted during a transmission intervention and/or as a limit to protect the transmission against damage in specific operating points. For this reason, and according to the invention, for a transmission intervention, a desired torque (indicated engine torque, combustion torque or clutch torque) is computed in dependence upon the following: the desired torque pregiven by the driver, the engine rpm and the shift direction. If a clutch torque (that is, the torque occurring at the output shaft of the drive unit) is pregiven, then the loss torques in the drive unit as well as the torque requirement of additional consumers are to be considered. At the start of a shift operation, the desired torque, which is computed in this manner, is controlled down from the actual value pregiven by the driver with a time-dependent ramp to the computed desired value. At the end of the shift operation, the desired torque value is controlled up with a time-dependent ramp from the computed desired value to the desired value pregiven by the driver. In the preferred embodiment, the ramp slopes are dependent upon the shift direction.

The determination of the desired engine torque during the shift operation is made with the aid of variables which are present in the engine control unit. Data from the transmission control unit as to the extent of the torque to be changed are not needed. The transmission control unit must only provide data with respect to the present shift operation (for example, upshifting or downshifting). The solution according to the invention has special significance in the case of a malfunction when a desired engine torque, which is to be determined by the transmission control unit, does not reach the engine control unit.

To protect the transmission against damage, a maximum permitted clutch torque is pregiven in dependence upon rpm and/or road speed of the vehicle when a drive stage is engaged. From this torque, and while considering the loss torques of the drive unit and the torque components of the consumers, a maximum combustion torque is formed which is maintained utilizing measures known to the state of the art, even when this torque is exceeded. As an alternative, and when a gear stage is engaged, a fixed value for the clutch torque is to be pregiven for each driving stage. This fixed value for the clutch torque becomes then active when the engine rpm is greater than a threshold and the road speed is less than a threshold. The coordination of the desired engine torques (for protecting the transmission, for controlling a shift operation, for controlling the drive slip control and for controlling the driver command) is carried out via a minimum value selection. In each case, the smallest value is transmitted further for controlling the engine torque. The corresponding desired values are limited to a minimum value in order to avoid too large a torque reduction during a shift operation or for an ASR intervention.

Figure 2:
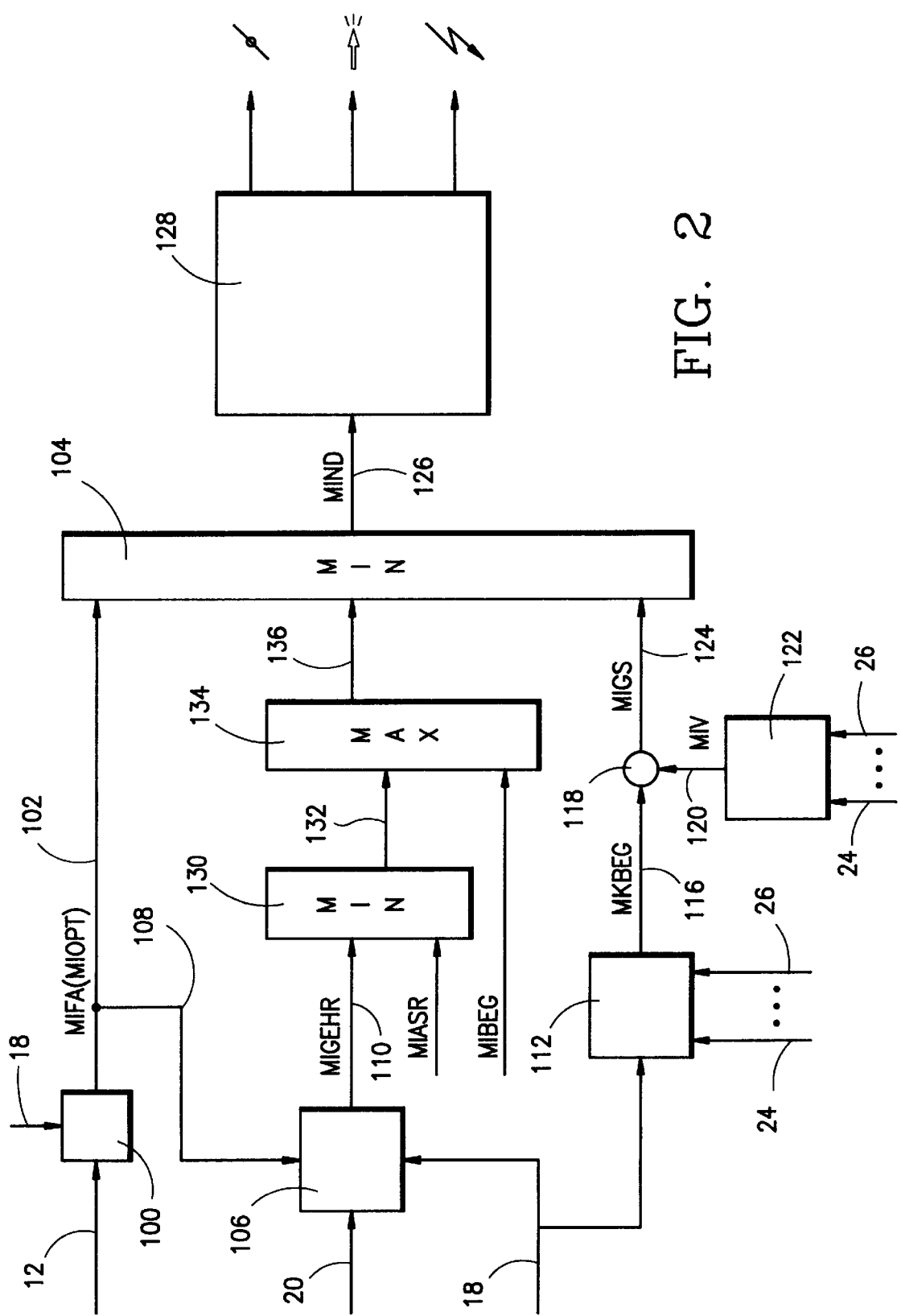
FIG. 2 shows an overview block circuit diagram of the solution of the invention.

The described procedure is carried out in the context of the program of a microcomputer which is part of the control unit 10. The structure of this program is shown in the overview block circuit diagram of FIG. 2.

A first characteristic field 100 is provided wherein the desired value MIFA, which is pregiven by the driver, is determined from the accelerator pedal position and the engine rpm. The accelerator pedal position is supplied via the line 12 and the engine rpm is supplied via line 18. The desired torque MIFA is conducted via the line 102 to the minimum value selector 104. The accelerator pedal position is not detected in another advantageous embodiment. In this embodiment, the desired torque MIFA is formed from the optimal torque MIOPT as a function of rpm and load multiplied by the ignition angle efficiency. The ignition angle efficiency then defines the torque amount of the deviation of the ignition angle, which would be adjusted without intervention, to the optimal ignition angle (highest efficiency). Furthermore, at least a second characteristic field 106 is provided wherein the desired engine torque is determined for the transmission intervention MIGEHR. This desired engine torque is determined in dependence upon the following: the driver command torque MIFA, the data as to the shift direction and the engine rpm. The driver command torque MIFA is supplied via the line 108 and the data as to the shift direction is supplied via the line 20 and the engine rpm is supplied via the line 18. In a preferred embodiment, two characteristic fields can be provided in lieu of the characteristic field 106. One of the characteristic fields is for the upshift and the other is for the downshift. The desired torque MIGEHR is conducted via a line 110 to the minimum value selection stage 130. The minimum value selection stage 130 is supplied with a desired torque MIASR when there is an ASR intervention via one of the input lines 24 to 26. The lower one of the values is conducted via a line 132 to a maximum value selection stage 134. The minimum torque MIBEG from a memory is also supplied to the maximum value selection stage 134. The larger of the two values is then supplied via a line 136 to the minimum value selection stage 104. In an advantageous embodiment, it is not the combustion torques which are pregiven as desired values, rather, the clutch torques. In accordance with the state of the art referred to initially herein, the lost torques of the drive unit and the torque components consumed by switch-on consumers are then to be considered.

In a further characteristic field 112, the limit clutch torque MKBEG is determined on the basis of the supplied engine rpm (line 114), the engaged driving stage and/or the road speed (lines 24 to 26). The limit clutch torque MKBEG is supplied via line 116 to the logic component 118. The characteristic field 112 can be a characteristic field, which is dependent upon rpm and road speed, for the maximum clutch torque as well as fixed values which are outputted for each driving state under specific operating conditions (engaged driving stage, engine rpm greater than a pregiven threshold and road speed less than a pregiven threshold).

The loss torque and consumer torque MIV are supplied via the line 120 from a characteristic field 122 to the limit torque. This loss torque and consumer torque are formed in accordance with the state of the art referred to initially herein and in accordance with operating variables such as engine temperature, engine rpm and status of ancillary consumers which are supplied via lines 24 to 26. The limit combustion torque MIGS is formed by the addition of the limit clutch torque and the loss torque. The limit combustion torque MIGS is supplied from the logic component 118 via the line 124 to the minimum value selection stage 104. The output line 126 of this minimum value selection stage transmits the selected desired torque MIND to a computation block 128 wherein the measures, which are known from the state of the art, are carried out for converting a desired combustion torque into an adjustment of the air supply, the fuel metering and/or the ignition angle.

A time-dependent ramp is provided for upcontrolling and downcontrolling the desired torque for the realization of the torque control during a shift operation.

Figure 3:
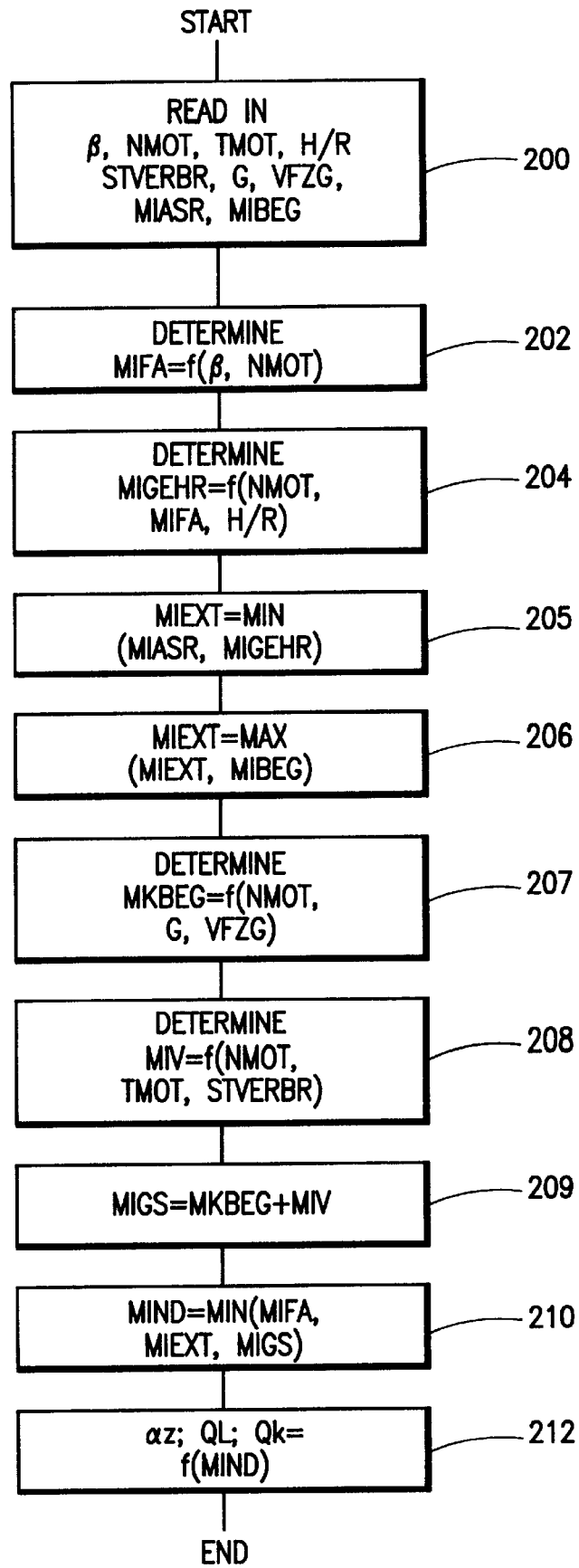

A realized example of the solution of the invention as a program of a microcomputer is shown in FIG. 3 as a flowchart. The subprogram shown in FIG. 3 is initiated at pregiven time points, for example, at intervals of 10 to 100 msec. In the first step 200, the necessary operating variables of accelerator pedal position β or engine load, engine rpm Nmot, engine temperature Tmot, data H/R as to the shift operation and the engaged driving stage G, road speed VFZG, the status of ancillary consumers STVERBR, the desired torque MIASR in the case of ASR as well as the limit torque MIBEG are read in.

Thereafter, in step 202, the desired torque MIFA, which is pregiven by the driver, is determined from a predetermined characteristic field at least in dependence upon engine rpm and accelerator pedal position or load and ignition angle efficiency. In the next step 204, the desired torque for a transmission intervention MIGEHR is determined in dependence upon the following: the data as to the transmission intervention, the engine rpm and the driver desired torque. Outside of a shift operation, this value is at a maximum value which is greater than the maximum adjustable torque. Thereupon, in steps 205 and 206, the external desired torque MIEXT is formed as the smallest of the desired values MIASR and MIGEHR and the largest of this value MIEXT and of the limit torque MIBEG. In the next step 207, the limit clutch torque MKBEG is computed in dependence upon engine rpm, gear position and road speed. In the next step 208, and in a manner known per se, the loss torque MIV is determined on the basis of the engine rpm Nmot, engine temperature Tmot and the status of the ancillary consumers. And, in step 209, the limit torque for the transmission protection MIGS is computed as an addition of the loss torque MIV and the limit clutch torque MKBEG. In the next step 210, the desired torque MIND is formed as a minimum value selection from the desired torques MIEXT, MIGS and MIFA and, in the next step 212, the following are adjusted in a manner known per se: ignition angle βz, air supply Q1 and/or fuel metering Qk. Thereafter, the subprogram is ended and repeated at a given time.

Figure 4A:
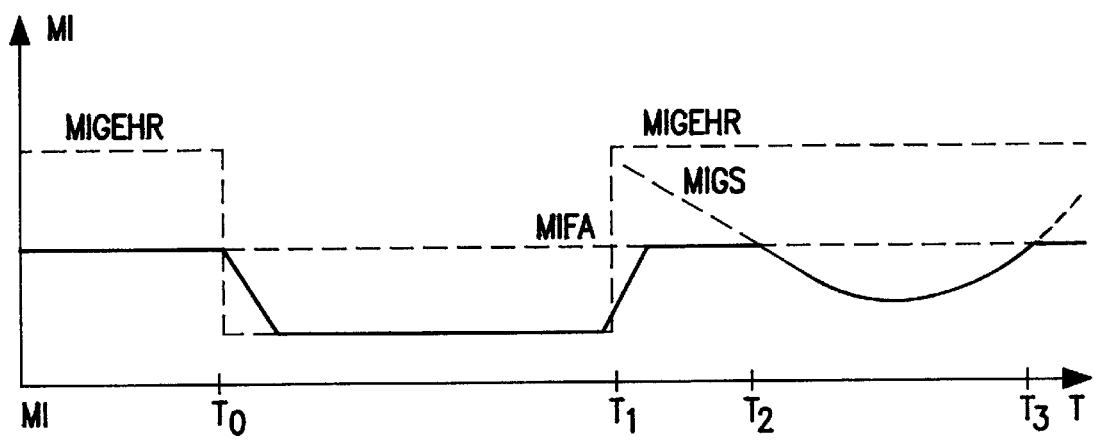
FIG. 4, the operation of the solution of the invention is shown with respect to exemplary time-dependent traces.
Figure 4B:
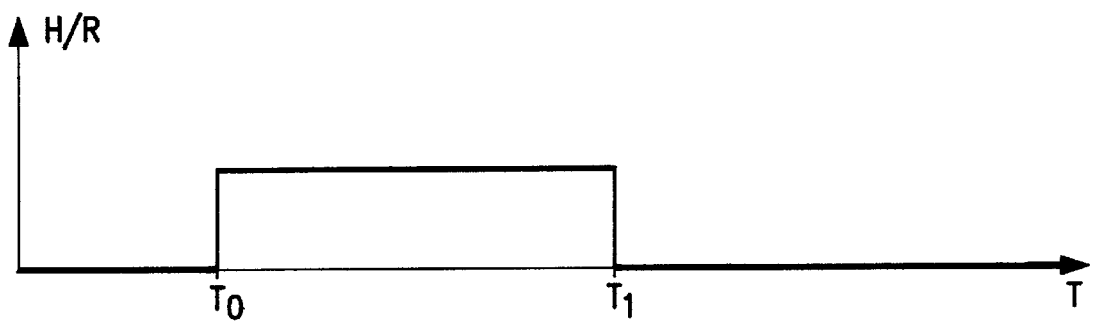

FIG. 4 shows time diagrams to explain the solution according to the invention. In FIG. 4a, the time-dependent trace of various desired torque values is shown and in FIG. 4b, the time-dependent trace of the transmission data signal is shown. First, the desired torque MIND (solid line) is determined via the driver desired torque MIFA. The desired torque for transmission intervention MIGEHR is at its maximum value so that the driver desired torque can be selected as desired torque in a minimum value selection. At time point T0, a shift operation begins which ends at time point T1. This leads to the computation of the desired torque value for transmission intervention in accordance with the above illustration. The desired torque for transmission intervention drops below the driver desired torque. This leads to the situation that, in the minimum value selection, the desired torque for transmission intervention is selected as a new desired torque. The transition between the two desired torques is smoothed by a time-dependent ramp. Correspondingly, at time point T1, the desired torque for transmission intervention is again set to its maximum value when the shift operation is ended. From this time point, the desired torque of the driver is again a command variable. Here too, the transition is effected via a time-dependent ramp. At time point T2, the vehicle moves into an operating state wherein the limit torque for the transmission protection MIGS drops below the driver desired torque. For this reason, and starting at this time point, the desired torque MIND is defined by the limit torque. At time point T3, the limit torque exceeds the driver torque so that, starting at this time point, the desired torque is again determined by the driver.

The torque determination during a shift operation and the determination of the limit torque for transmission protection are applied together in a preferred embodiment. In other advantageous embodiments, either the limit torque determination or the torque determination for transmission intervention is utilized.

What is claimed is:

1. A method for controlling the torque outputted by a drive unit, the torque being dependent upon at least one desired torque value pregiven by the driver, the method comprising the steps of:

during a transmission shift, pregiving a desired torque value in dependence upon the desired torque value of the driver;

adjusting the torque outputted by the drive unit to the particular lower desired torque value; and, wherein the desired torque is pregiven during a shift operation in dependence upon data as to the shift direction.

2. A method for controlling the torque outputted by a drive unit, the torque being dependent upon at least one desired torque value pregiven by the driver, the method comprising the steps of:

during a transmission shift, pregiving a desired torque value in dependence upon the desired torque value of the driver;

adjusting the torque outputted by the drive unit to the particular lower desired torque value; and, wherein, at the start of the transmission intervention, the desired torque is controlled down from the instantaneous value with a ramp to the desired value at transmission intervention and, at the end of the transmission intervention, the instantaneous value is controlled up in accordance with a ramp.

3. A method for controlling the torque outputted by a drive unit, the torque being dependent upon at least one desired torque value pregiven by the driver, the method comprising the steps of:

during a transmission shift, pregiving a desired torque value in dependence upon the desired torque value of the driver;

adjusting the torque outputted by the drive unit to the particular lower desired torque value; and, wherein the maximum permitted torque is pregiven for transmission protection in dependence upon the engine rpm, the driving stage and/or the road speed of the vehicle.

4. A method for controlling the torque outputted by a drive unit, the torque being dependent upon at least one desired torque value pregiven by the driver, the method comprising the steps of:

during a transmission shift, pregiving a desired torque value in dependence upon the desired torque value of the driver;

adjusting the torque outputted by the drive unit to the particular lower desired torque value; and, wherein, for each driving stage, a fixed value is provided as a limit value which is then pregiven when the engine rpm is greater and the road speed is less than a speed threshold.

5. A method for controlling the torque outputted by a drive unit, the torque being dependent upon at least one desired torque value pregiven by the driver, the method comprising the steps of:

during a transmission shift, pregiving a desired torque value in dependence upon the desired torque value of the driver;

adjusting the torque outputted by the drive unit to the particular lower desired torque value; and, wherein the desired torque is a value for the combustion torque of an internal combustion engine or for the clutch torque of the drive unit.

6. A method for controlling the torque outputted by a drive unit, the torque being adjusted in dependence upon at least one desired torque value, the method comprising the steps of:

determining a limit value which limits the torque outputted by said drive unit to protect the transmission;

adjusting the torque of the drive unit on the basis of lower value of desired torque value and limit torque; and, wherein the desired torque is pregiven during a shift operation in dependence upon data as to the shift direction.

7. A method for controlling the torque outputted by a drive unit, the torque being adjusted in dependence upon at least one desired torque value, the method comprising the steps of:

determining a limit value which limits the torque outputted by said drive unit to protect the transmission;

adjusting the torque of the drive unit on the basis of lower value of desired torque value and limit torque; and, wherein, at the start of the transmission intervention, the desired torque is controlled down from the instantaneous value with a ramp to the desired value at transmission intervention and, at the end of the transmission intervention, the instantaneous value is controlled up in accordance with a ramp.

8. A method for controlling the torque outputted by a drive unit, the torque being adjusted in dependence upon at least one desired torque value, the method comprising the steps of:

determining a limit value which limits the torque outputted by said drive unit to protect the transmission;

adjusting the torque of the drive unit on the basis of lower value of desired torque value and limit torque; and, wherein the maximum permitted torque is pregiven for transmission protection in dependence upon the engine rpm, the driving stage and/or the road speed of the vehicle.

9. A method for controlling the torque outputted by a drive unit, the torque being adjusted in dependence upon at least one desired torque value, the method comprising the steps of:

determining a limit value which limits the torque outputted by said drive unit to protect the transmission;

adjusting the torque of the drive unit on the basis of lower value of desired torque value and limit torque; and, wherein, for each driving stage, a fixed value is provided as a limit value which is then pregiven when the engine rpm is greater and the road speed is less than a speed threshold.

10. A method for controlling the torque outputted by a drive unit, the torque being adjusted in dependence upon at least one desired torque value, the method comprising the steps of:

determining a limit value which limits the torque outputted by said drive unit to protect the transmission;

adjusting the torque of the drive unit on the basis of lower value of desired torque value and limit torque; and, wherein the desired torque is a value for the combustion torque of an internal combustion engine or for the clutch torque of the drive unit.

11. An arrangement for controlling the torque of a drive unit, the arrangement comprising:

a control unit for adjusting the torque of the drive unit at least in dependence upon a first desired torque value (MIND);

said control unit functioning to:

determine a second desired torque value (MIFA) pregiven by the driver;

determine whether a transmission shift operation is present;

form a third desired torque value (MIGEHR) on the basis of said second desired torque value (MIFA) when said shift operation is present; and, form said first desired torque value (MIND) for controlling said drive unit in dependence upon the lesser of said second desired torque value (MIFA) and said third desired torque value (MIGEHR) for said shift operation.

12. A method for controlling the torque of a drive unit connected to a transmission, the torque being adjusted in dependence upon at least a desired value (MIND), the method comprising the steps of:

determining a limit torque value (MIGS) for limiting the torque of the drive unit to protect the transmission;

determining at least a desired torque value (MIFA, MIEXT) which is at least pregiven by the driver; and, forming the desired torque (MIND) for controlling the drive unit on the basis of the lesser value of said limit torque value (MIGS) and the desired torque value (MIFA, MIEXT).

13. An arrangement for controlling the torque of a drive unit connected to a transmission, the arrangement comprising:

a control unit for adjusting the torque of the drive unit on the basis of a desired value (MIND);

said control unit functioning to:

determine a limit torque value (MIGS) to protect the transmission;

form at least a desired torque value (MIFA, MIEXT) for the torque of the drive unit which is at least pregiven by the driver; and, input the desired torque (MIND), in dependence upon which the torque of the drive unit is adjusted, as the lesser value of said limit torque value (MIGS) and the desired torque value (MIFA, MIEXT).

14. A method for controlling the torque of a drive unit, the torque being dependent upon at least a first desired torque value (MIND) pregiven by the driver, the method comprising the steps of:

determining a second desired torque value (MIFA) pregiven by the driver;

determining whether a transmission shift operation is present;

forming a third desired torque value (MIGEHR) on the basis of said second desired torque value (MIFA) when said shift operation is present; and, determining said first desired torque value (MIND) for controlling said drive unit in dependence upon the lesser of said second desired torque value (MIFA) and said third desired torque value (MIGEHR) for said shift operation.

15. The method of claim 14, wherein the third desired torque value (MIGEHR) is pregiven during a shift operation in dependence upon the engine rpm.

* * * * *